(12) United States Patent
Jonkka (10) Patent No.: US 7,101,140 B2
(45) Date of Patent: Sep. 5, 2006

(54) APPARATUS FOR STORAGE AND UNLOADING OF GRANULAR MATERIAL

(75) Inventor: Arvo Jonkka, Pori (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/518,456

(22) PCT Filed: Jan. 24, 2003

(86) PCT No.: PCT/FI03/00058

§ 371 (c)(1),
(2), (4) Date: Dec. 22, 2004

(87) PCT Pub. No.: WO2004/065272

PCT Pub. Date: Aug. 5, 2004

(65) Prior Publication Data

US 2005/0201851 A1    Sep. 15, 2005

(51) Int. Cl.
*B65G 1/00* (2006.01)
(52) U.S. Cl. .................. 414/302; 414/310; 414/326; 198/519; 198/671; 198/861.4
(58) Field of Classification Search ................ 414/298, 414/299, 300, 301, 302, 306, 310, 326; 198/317, 198/318, 511, 519, 671, 861.4
See application file for complete search history.

(56) References Cited

U.S. PATENT DOCUMENTS

| | | | | |
|---|---|---|---|---|
| 2,649,215 A | * | 8/1953 | Dickson | 414/298 |
| 2,790,563 A | * | 4/1957 | McCarthy | 414/312 |
| 3,438,517 A | * | 4/1969 | Steffen | 414/295 |
| 3,487,961 A | * | 1/1970 | Neuenschwander | 366/133 |
| 3,526,328 A | * | 9/1970 | Garret et al. | 414/298 |
| 3,557,979 A | * | 1/1971 | Zortman | 414/287 |
| 3,661,283 A | | 5/1972 | Fischer et al. | |
| 3,713,552 A | * | 1/1973 | Schnyder | 414/287 |
| 3,765,548 A | * | 10/1973 | Shivvers | 414/310 |
| 3,847,289 A | * | 11/1974 | Fischer | 198/519 |
| 4,154,332 A | * | 5/1979 | Schlegel | 198/507 |
| 4,217,701 A | * | 8/1980 | Mathews | 34/211 |
| 4,286,909 A | * | 9/1981 | Tingskog | 414/142.5 |
| 4,322,021 A | * | 3/1982 | Olsson | 222/231 |
| 4,401,404 A | * | 8/1983 | Weaver | 414/292 |
| 4,451,192 A | * | 5/1984 | Wood | 414/306 |
| 4,492,302 A | * | 1/1985 | Svens | 198/671 |
| 4,537,553 A | * | 8/1985 | Andersson | 414/302 |
| 4,721,425 A | * | 1/1988 | Strocker | 414/298 |

(Continued)

FOREIGN PATENT DOCUMENTS

SE    516 935    12/2000

(Continued)

*Primary Examiner*—Joe Dillon, Jr.
(74) *Attorney, Agent, or Firm*—Buchanan Ingersoll & Rooney PC (57) ABSTRACT

The object of the invention is an apparatus for storage of wood chips in a curved-top stockpile the apparatus consisting of a central tower which supports a conveyor for loading the chips and a beam-like turning pile composer, and a unloading beam supported on ground level on the lower part of the tower as well as on supporting wheels and furnished with unloading devices for transporting the wood chips towards the center of the apparatus. The central tower is furnished at one side with a tubular ex-central opening, and the tower occupies a central tube for delivering the wood chips either upwards or downwards from the opening, whereby a service and passage space is formed between the mantle of the central tower and the transport tube

6 Claims, 7 Drawing Sheets

U.S. PATENT DOCUMENTS

| | | | |
|---|---|---|---|
| 4,775,278 A * | 10/1988 | Fischer et al. | 414/317 |
| 5,098,247 A * | 3/1992 | Campbell | 414/326 |
| 5,180,272 A * | 1/1993 | Campbell | 414/313 |
| 5,366,067 A * | 11/1994 | Courtois et al. | 198/518 |
| 5,722,529 A * | 3/1998 | Manjunath et al. | 198/671 |
| 5,845,762 A * | 12/1998 | Stark | 198/550.1 |
| 6,203,261 B1 * | 3/2001 | South et al. | 414/317 |
| 6,254,329 B1 * | 7/2001 | Sukup et al. | 414/310 |
| 6,676,357 B1 * | 1/2004 | Stafford et al. | 414/306 |

FOREIGN PATENT DOCUMENTS

WO     WO 00/75053     12/2000

* cited by examiner

APPARATUS FOR STORAGE AND UNLOADING OF GRANULAR MATERIAL

The invention relates to an apparatus for storage of wood chips in an open-yard or silo storage as a conical or curved-top stockpile and, respectively, for unloading material from this type of stockpile. While the invention is particularly advantageously related to the storage of wood chips, it is also suited for use in the storage of other granular material such as bark, coal, grain and the like It is known to store chips in stockpiles by a method wherein chips are stacked in a curved-top pile having typically a diameter of 80 to 150 m and a height of 20 to 30 m. In these methods, green chips are stacked at one end of the stockpile while earlier stored chips are unloaded from the other end. By virtue of this method, the storage time of chips can be kept optimal in regard to the later processing steps inasmuch the stockpile is always unloaded at the end containing the longest stored chips In conventionally used chip storage facilities meeting the above requirements, green chips are transported over the top level of the stockpile by means of a belt conveyor, adapted to operate in a conveyor bridge, to the upper portion of a tower-like structure located in the center of the curved-top stockpile. Below the conveyor bridge, on the top portion of the tower structure is supported a rotatable boom. Chips are dropped via a hopper onto a belt conveyor adapted into the boom which in this manner creates a curved stockpile around the tower. The top of the stockpile is kept at a constant height with the help of an automatic level sensor. The chips are unloaded from the stockpile by means of a rotary reclaim conveyor bridge that houses a reclaim conveyor and is connected to the lower portion of the tower by its one end. To the distal end of the reclaim conveyor bridge are mounted driven wheels that run on the storage yard along a track encircling the stockpile. As known in the art, the reclaim conveyor may be a drag conveyor or, alternatively, an auger conveyor equipped with one or more augers. To the reclaim conveyor bridge is further adapted a rake-like lattice which is adapted to move reciprocatingly driven in the direction of the reclaim conveyor bridge so as to collapse the stockpile onto the reclaim conveyor. The reclaim conveyor bridge has in a reclaim system of this type a length of 40 to 70 m, and is consequently quite heavy, having completely equipped a weight of 50 to 100 tons.

The reclaim conveyor transfers chips into an open hopper located in the foot of the tower, conventionally embedded in the foundation construction, and forming a circulating ring around the tower, from which hopper the chips fall onto a conveyor located beneath the chip storage, and delivering the chips from the storage area. As a security issue it is to be noted that this kind of open hopper is not well suited for the purpose because besides the chips, also other items may fall into it, including operating personnel, animals and other non-intended obstacles.

A significant point in the investment into these kinds of storage methods is a tunnel to be constructed below the storage yard for the delivery conveyor that takes chips off from the center of the storage yard. Also the tower foundation must be made rigid, inasmuch the tower is supported by its top only from one direction by the importing conveyor bridge that feeds chips to the storage facility. Moreover, using a belt conveyor in the transportation of chips, a further constraint is that the conveyor may be angled maximally at 20%, typically at 11 to 12%, whereby the length of the delivery conveyor receiving chips from below the stockpile becomes very long, because the chips must ultimately be transported up to the top of a cooking plant, grinder building or screening house.

Curved-top pile storages for chips are also known where the chips are reclaimed from the surface of the pile, and transported further from the ground level. Said storage system is, however, not very suited for utilizing an optimized storage time, because the stationary transport conveyor cuts the pile constantly at a same location.

As a controlled unloading capacity is required from the apparatus of the invention, the machinery turning the heavy unloading bridge must be controlled and furnished with a control drive of its own. Similarly the unloading auger in the bridge must be furnished with a controlled drive of its own or even in some cases with two drives. The transportation conveyor delivering the chips further from the unloading bridge has its own operation requirements. The apparatus of the invention is to be continuously operating, and longer service stops are not allowed, and especially a situation where the storage becomes empty, is totally excluded. This means that the robust machinery parts are to be quite easily and quickly to be serviced, and the service personnel must have access to the locations requiring inspection and service.

The essential characterizing features of an apparatus implementing the method according to the invention are disclosed in appended claims.

Next, the invention will be examined in greater detail by making reference to the appended drawings, wherein.

Figure 1:
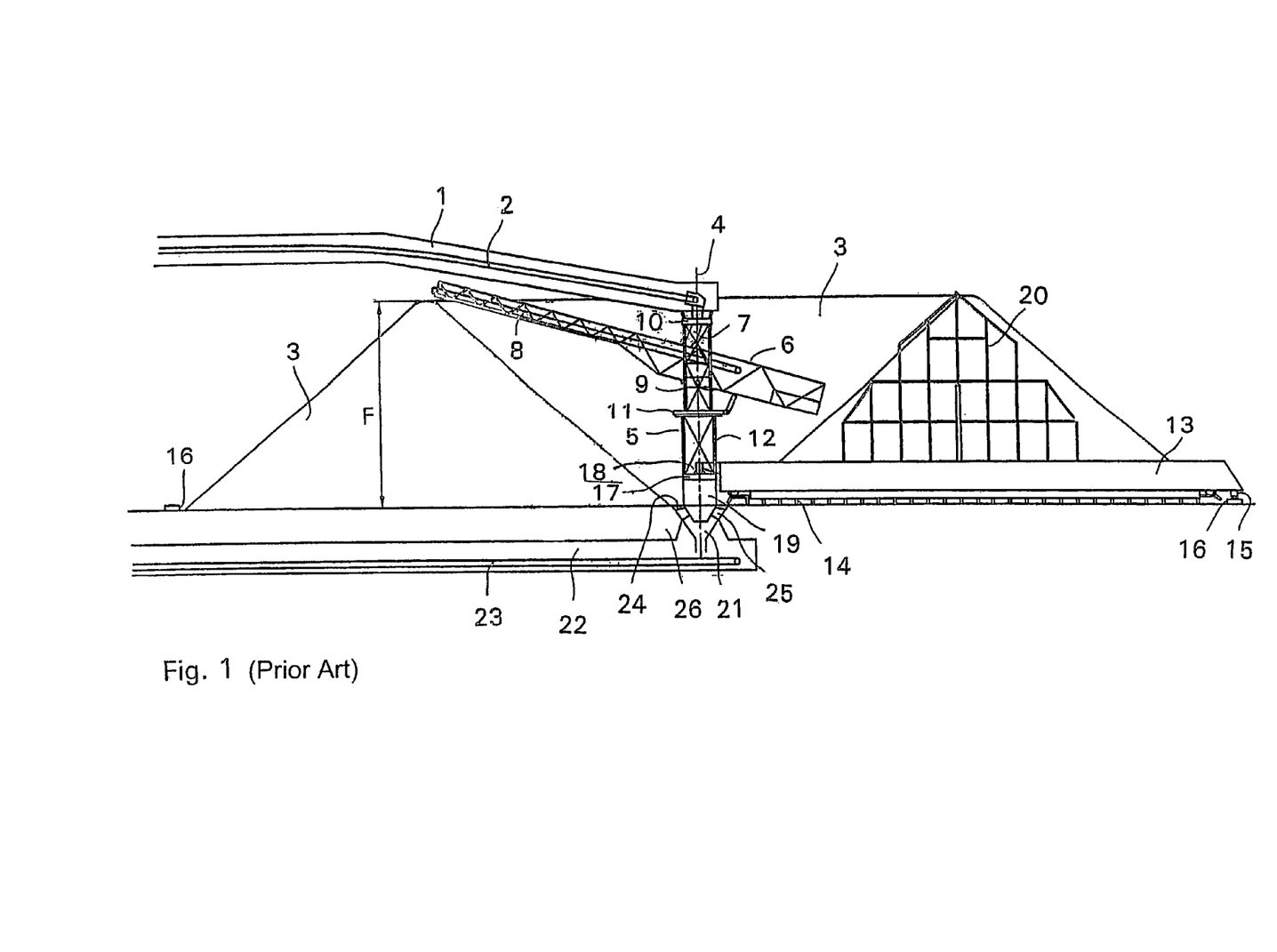
FIG. 1 is a side view of an apparatus stacking and unloading a curved-top stockpile according to a conventional procedure.

Referring to FIG. 1, therein is illustrated a prior system stacking and unloading a curved-top stockpile. Chips are transported by means of a conveyor 2, conventionally a belt conveyor, adapted to operate in a conveyor bridge 1, into a tower-like central structure 5 located to the center of a curved-top stockpile 3. Below the conveyor bridge 1, on the upper portion of the central tower 5 is supported a stacking boom 6 capable of rotating about the center 4 of the tower. Chips are passed via a hopper 7 onto a belt conveyor 8 operating in the interior of the stacking boom such that a stockpile 3 essentially surrounding the central tower is created. The stacking boom 6 is connected to the boom support portion 9 of the tower that is mounted in bearing 10 on the conveyor bridge and in bearing 11 on the lower portion 12 of the tower. The stack is diminished by a unloading conveyor bridge 13 which is supported at its one end on the lower part of 12 of the tower, and rotating to certain direction around the tower center 4. To the outer end of the unloading conveyor bridge 13 is mounted a driven support wheel assembly 15 that runs along a track 16 encircling the curved-top stockpile 3. While the embodiment of FIG. 1 uses a drag conveyor 14 as the unloading conveyor, alternatively an auger conveyor may be employed.

The lower portion 12 of the tower having the unloading conveyor bridge 13 connected thereto by a pivot pin 18 is mounted in bearing 11 to the boom support portion 9 of the tower and in bearing 17 to a foundation frame 19 of the tower.

In the unbloading conveyor bridge 13 is further adapted to include a rake-like lattice 20 which is adapted to move collapse the stockpile 3 onto the unloading conveyor 14. The unloading conveyor transfers chips into a hopper 21, which is located around the bottom of the tower. The outer diameter of the annular opening is on the top 6 to 8 meters. The opening 24 diminishes below the tower to a funnel 21, from which the chips fall onto a conveyor 23 located in a tunnel 22 below the stockpile 3 and transferring chips away from the storage. The bottom 19 of the tower is supported on the ground foundation 26 by beams 25 crossing the opening 24.

Figure 2:
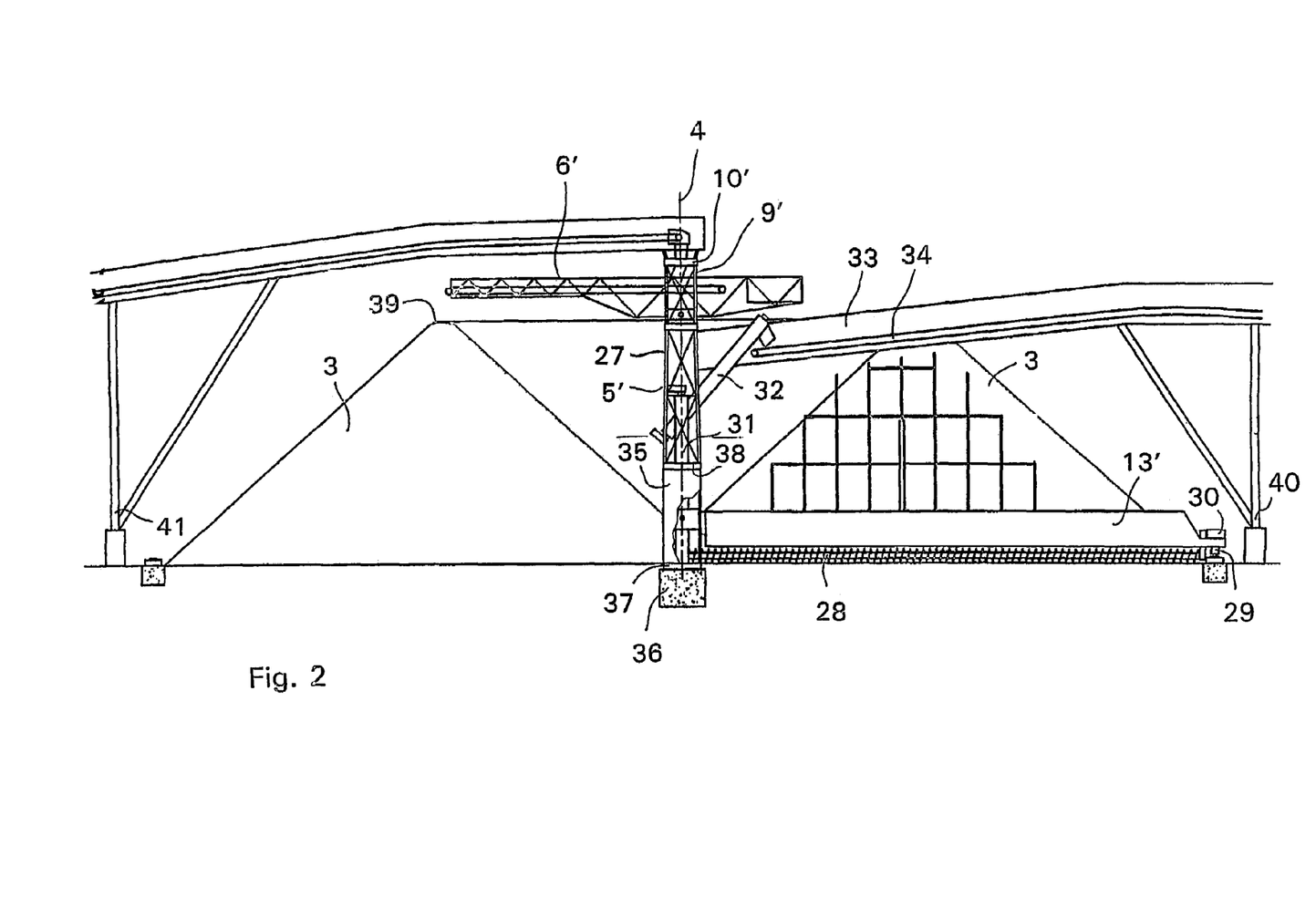
FIG. 2 is a side view of a storage apparatus according to the invention stacking and unloading a curved-top stockpile.

Now referring to FIG. 2, therein is shown a storage apparatus according to the present invention. The stockpile 3 is created in the same fashion as described above A boom portion 9' of a tower is at its top end connected to the conveyor bridge in bearing 10'. The lower part of the boom portion 9' of the tower is mounted in bearing to a stationary center portion 27 of the tower In FIG. 2, the unloading conveyor adapted to the unloading conveyor bridge 13' is shown to be an auger conveyor 28. The distal end of the unloading conveyor bridge is supported on a drive carriage 29 that in addition to a drive for its wheels also houses drive machinery 30 of unloading conveyor auger 28. This arrangement makes it easy to service the drives from the exterior side of the stockpile. The unloading conveyor 28 feeds chips to a two-part vertical screw conveyor 31. The vertical screw conveyor 31 elevates chips onto an uphill-angled auger conveyor 32 that further transfers chips onto a belt conveyor 24 operating at a lower level on a bridge 33. Alternatively, the vertical screw conveyor 31 may be arranged to elevate chips directly onto the belt conveyor 34. It is beneficial of using a two-part vertical screw conveyor 31 in the invention because the lower portion 35 of the tower to rotate about the tower center 4 independently from the stationary middle portion 27 of the tower. The lower portion 35 of the tower is mounted to a foundation 36 in bearing 37 and to the stationary middle portion 27 of the tower in bearing 38

The lower conveyor bridge 33 is attached to the stationary center portion 27 of the tower, wherefrom the conveyor bridge travels over the stockpile 3 or even tangentially to the top of the stockpile top 39, whereby the starting level of the chip transportation path from the storage is almost equal to the stockpile height. By way of orienting the lower 33 and the upper 1 conveyor bridges in different directions, the tower can be supported at its top from different directions by support feet 40 and 41 against wind forces imposed thereon. In contrast, a conventional storage facility having the tower supported by one conveyor bridge only needs very rigid foundation constructions to cope with windforces. As a result, an apparatus according to the invention can have a lighter foundation that only needs to bear the weight of the apparatus.

Figure 3:
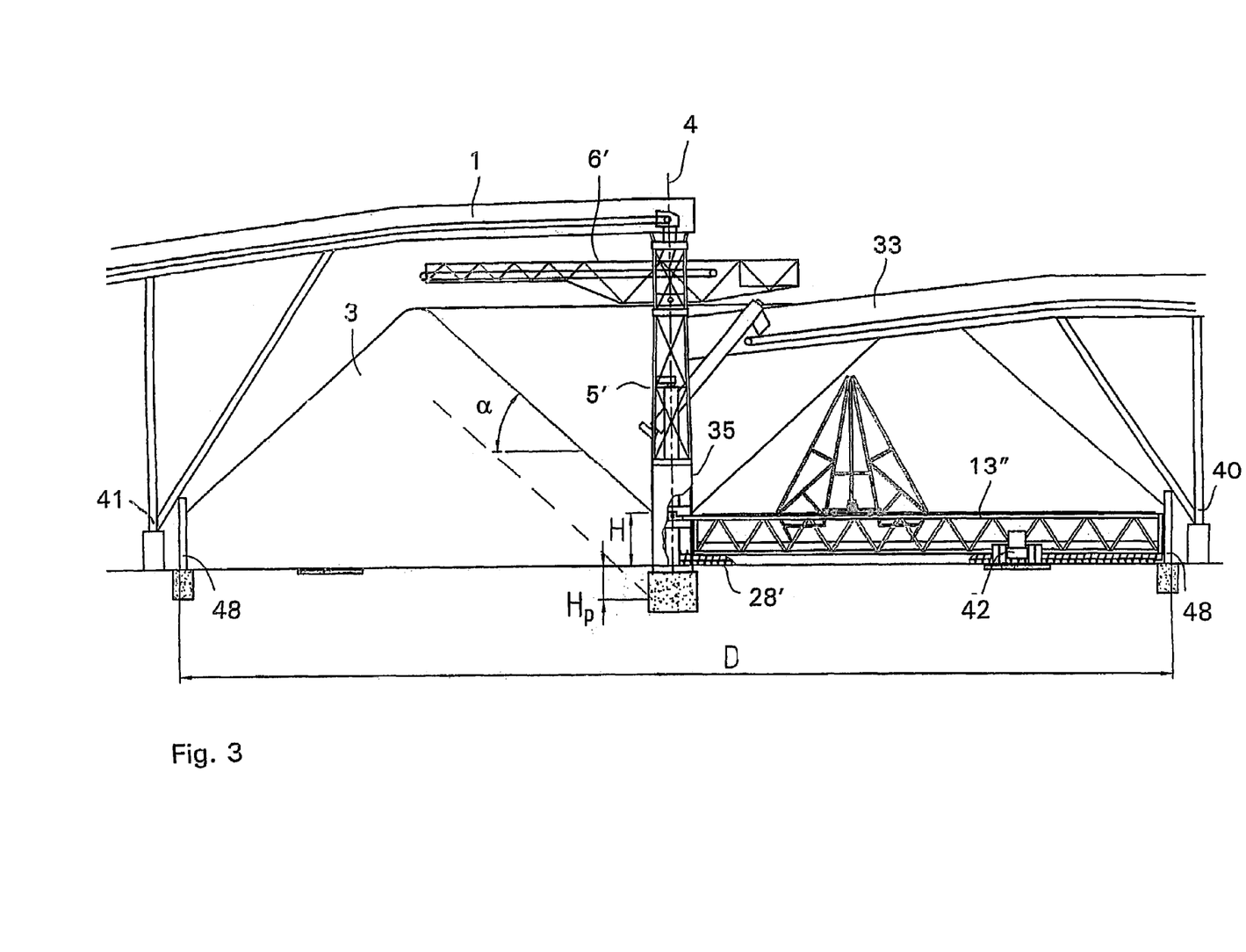
FIG. 3 is an alternative embodiment of an apparatus according to the invention for stacking and unloading a curved-top stockpile.

FIG. 3 shows an alternative construction for the unloading bridge 13". The outer end of the unloading bridge is supported by a carriage 42 at a distance about ⅓ from the outer circle of the traveling path of the unloading bridge. It is beneficial to arrange the support for the unloading bridge at a certain distance from the end of the bridge in cases where the length of the bridge exceeds the length commonly used. The intermediate support forms a steady construction with moderate costs. Especially this is beneficial in connection with unloading bridges with a length of over 60 meters.

Figure 4:
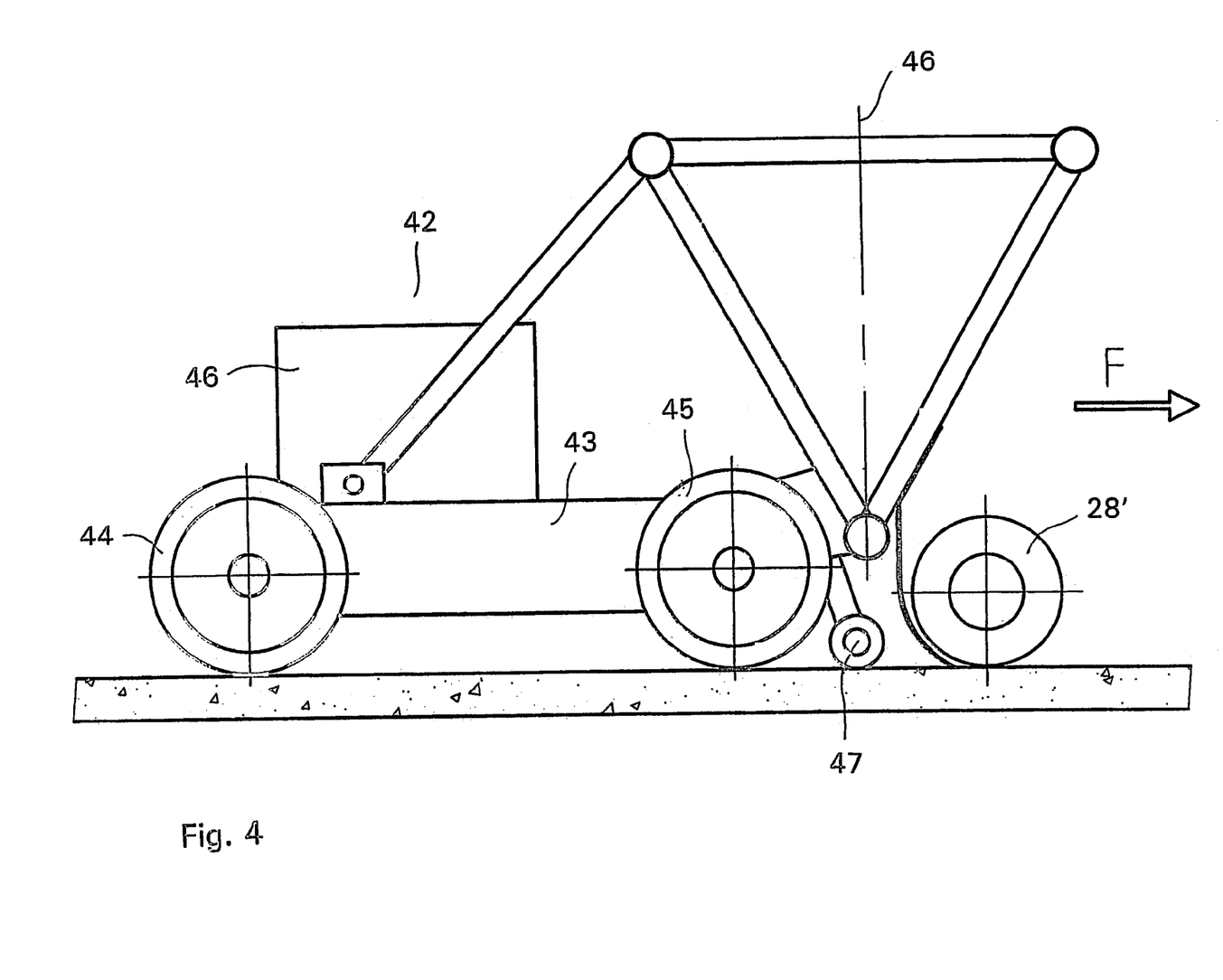
FIG. 4 discloses an intermediate support for the unloading bridge.

The carriage 42 disclosed on FIG. 4 consists of a carriage chassis 43, of wheels 44, 45 and of a counter-weight 46. The counter-weight is needed to balance the bridge 13", because the subsequent wheels 44, 45 of the carriage 42 are disposed on the same site from the balance point of the bridge 13". The balance point is in the vicinity of the middle point 46 of the bridge 13". The transport screw 28' is positioned on the opposite site of the bridge in respect to the carriage 42. An arrow F marks the moving direction of the bridge. A cleaning device 47 is assembled behind the screw 28' for brushing the travelling path of the wheels 44, 45.

In an apparatus according to the invention, the inner perimeter of the stockpile can be allowed to rest against the tower up to a height H (most advantageously H is 2 to 4 m), as indicated in FIG. 3. Then, the lower portion of the tower is made from sheet plate at least up to the height H. A conventional apparatus construction has a discharge funnel made at the root of the tower, whereby H is smaller than zero meters (generally so that H is about −1 m), in FIG. 3 $H_p$. Assuming the stockpile envelope angle to be α, the stockpile can be moved closer to the tower center by a distance H/tan α. In the case of chip storage, this distance is about 4.5 meters. As a result, diameter D of the footprint requited by the chip storage according to the present invention is 9 meters smaller than in conventional storage arrangements according to FIG. 1.

When the unloading bridge is furnished with an intermediate support the diameter D of the curved-top pile can be further diminished without limiting the storage volume by slightly increasing the pile height. This becomes possible when a wall 48 surrounding the pile is in use, as depicted in FIG. 3. In case the height of the wall is 2 meters, the outer diameter of the pile can be diminished by about 4 meters. Proper service doors are naturally to be included in the wall.

Figure 5:
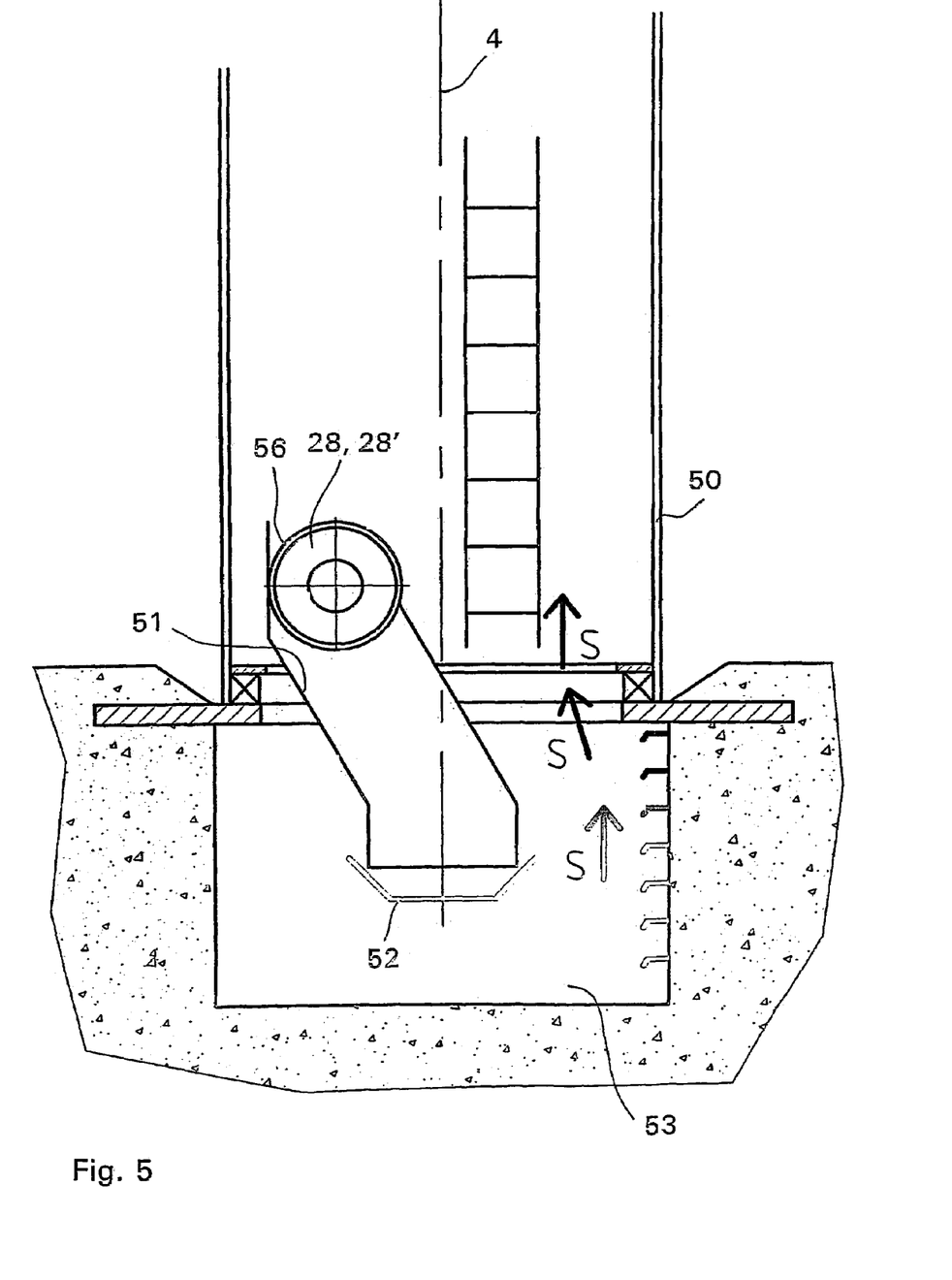
FIG. 5 illustrates the material delivery to the hopper.
Figure 6:
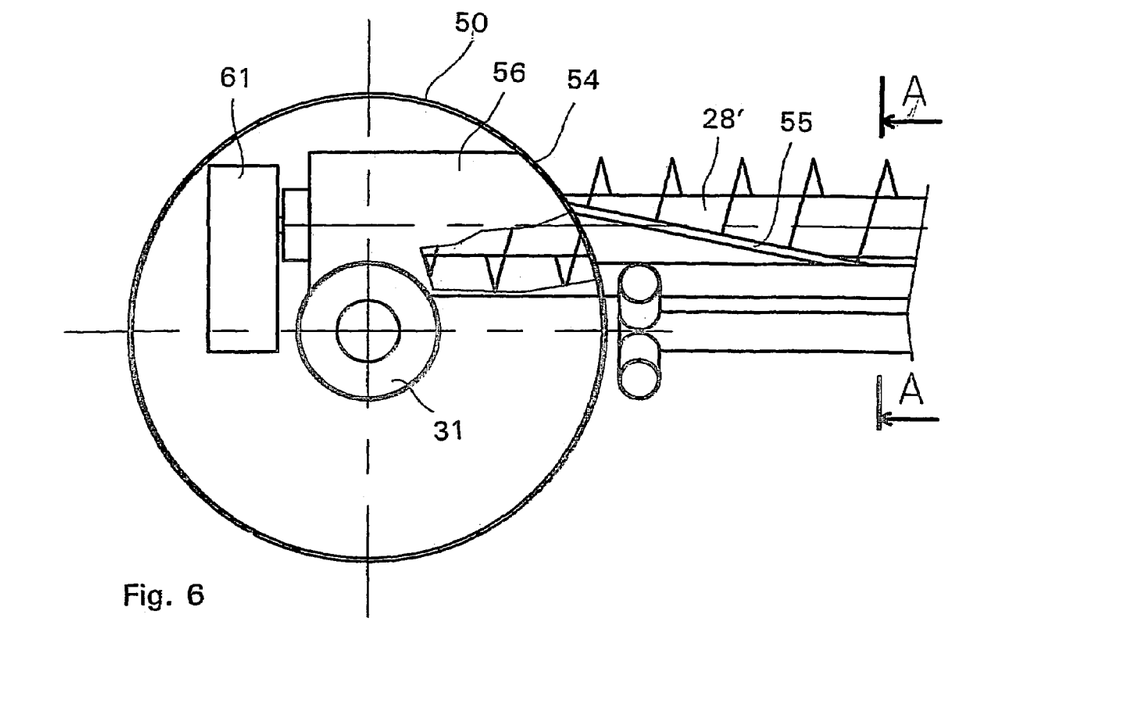
FIG. 6 illustrates a sectional view of the feet portion of the tower, seen from above.
Figure 7:
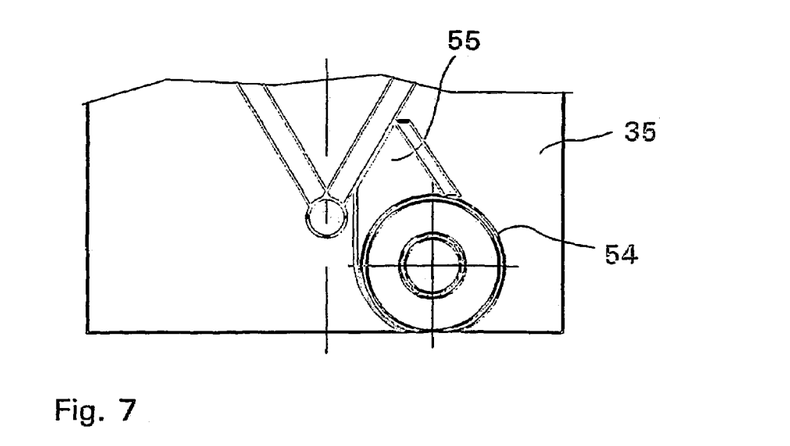
FIG. 7 is a sectional view A—A from FIG. 6 seen in upright position.

Due to the above mentioned measures resulting to a diminishing in the pile diameter the support beams 40, 41 for the transport bridges can be positioned closer to the center 4 of the pile. Consequently, lighter constructions in the bridges 1 and 33 are possible Unloading of the chips from the pile in the apparatus of the invention may be arranged either over the pile as depicted in FIGS. 2, 3, 6 and 8, or under the pile, as depicted in FIG. 5. In either of the cases the material to be unloaded is transported inside of the mantle 50 of the tower, where it is directed either upwards or downwards. In FIG. 5 a screw conveyor 28, 28' transport the material in a tube 56 to a funnel 51 inside the tower, and further onto a lower band conveyor 52. In this case the material is transported further below the pile, as depicted in FIG. 1. Due to the construction it is possible to the service personnel to approach the tower from the tunnel 53 below the pile in the direction of the arrows S, as well as in the return direction. This is an essential security advantage. Also the control of the process, in addition to the service, is easier Drawing FIGS. 6 and 7 show the connection between the screw 28' and the lower part 35 of the tower. The screw 28' is passed through an opening 54 in a, at least in its lower part contiguous mantle 50. The screw 28' transports the material along a guidance wall 55 towards an opening 54 in the tower mantle. Inside the mantle 50 the screw is surrounded by a screw chute 56, along which the material is transported to a lifting screw 31 positioned in the center of the tower.

When an intermediate support for the unloading bridge 13" is used, the drive 61 for the screw 28' is positioned in the lower part 35 of the tower, inside the mantle 50.

Figure 8:
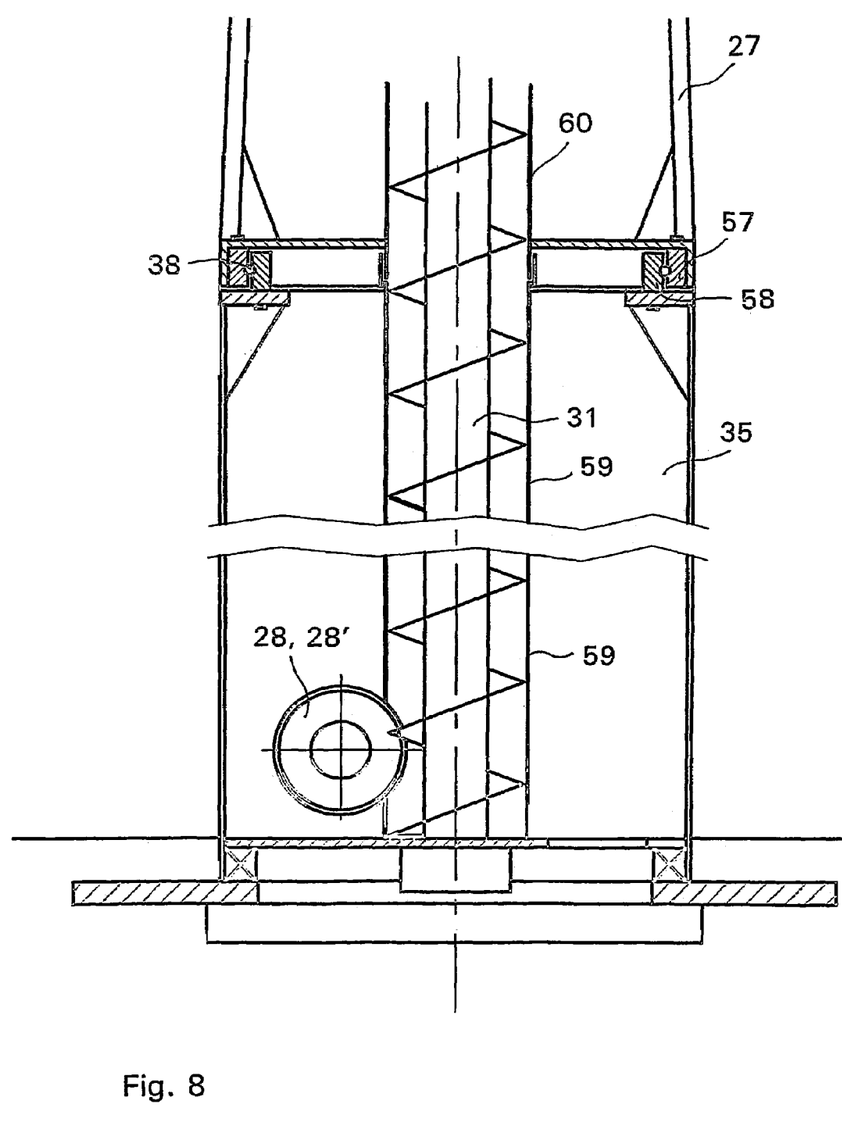
FIG. 8 illustrates the construction of the lifting conveyor.

The bearing construction 38 between the lower part 35 of the tower and the stationary middle part 27 is presented in the drawing FIG. 8. The outer ring 57 of the bearing is attached to the stationary middle part 27 of the tower, and the inner ring 58 is attached to the rotating lower part 35 of the tower. The mantle of the vertical screw 31 consists of two parts. The lower part 59 of the mantle is attached to the rotating lower part 35 of the tower and the parts rotate together along the unloading bridge 13', 13". The upper part 60 of the mantle is firmly supported on the stationary middle part 27 of the tower. It is important to center the halves of the mantle of the vertical screw 31, wherefor the halves can alternatively be connected by bearings to each other in order to avoid a radial mutual displacement of the halves.

What is claimed is:

1. An apparatus for storage of wood chips in a curved-top stockpile (3) the apparatus consisting of a central tower defining a center (5'), which supports a conveyor and a beam-like turning pile composer for loading the chips (6'), and an unloading beam (13', 13") supported on ground level on the lower part (35) of the tower as well as on supporting wheels (29, 44, 45) and furnished with unloading devices (28) for transporting the wood chips towards the center (4) of the apparatus, wherein the central tower is furnished at one side with a tubular eccentric opening (54) for receiving the wood chips, and that a central tube (51, 59) is occupied inside the tower for directing the wood chips upwards or downwards from the opening, whereby a service and passage space is formed between a mantle of the central tower and a transfer tube.

2. The apparatus according to claim 1, wherein the unloading devices (28) include a guiding plate (55) for directing the wood chips to the opening (54) in the central tower.

3. The apparatus according to claim 1, wherein the central (4) tube in the tower consists of a outer mantle of a vertical screw, the lower part (59) of which mantle being rotating along the lower part (35) of the tower.

4. The apparatus according to claim 1, wherein the central tube in the tower consists of a funnel (51) directing the material flow downwards.

5. The apparatus according to claim 2, wherein the central (4) tube in the tower consists of a outer mantle of a vertical screw, the lower part (59) of which mantle being rotating along the lower part (35) of the tower.

6. The apparatus according to claim 2, wherein the central tube in the tower consists of a funnel (51) directing the material flow downwards.

* * * * *